(12) United States Patent
Ball, IV

(10) Patent No.: US 10,300,405 B2
(45) Date of Patent: *May 28, 2019

(54) HYDRODYNAMIC WATER-OIL SEPARATION BREAKTHROUGH

(71) Applicant: KBK Industries, LLC, Rush Center, KS (US)

(72) Inventor: Will D. Ball, IV, Bixby, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 16/049,195

(22) Filed: Jul. 30, 2018

(65) Prior Publication Data

US 2018/0333655 A1    Nov. 22, 2018

Related U.S. Application Data

(63) Continuation of application No. 15/652,998, filed on Jul. 18, 2017, now Pat. No. 10,035,082, which is a continuation of application No. 14/337,900, filed on Jul. 22, 2014, now Pat. No. 9,744,478.

(51) Int. Cl.
*B01D 19/00* (2006.01)
*B01D 17/02* (2006.01)
*E21B 43/34* (2006.01)
*B01D 21/24* (2006.01)

(52) U.S. Cl.
CPC ...... *B01D 17/0211* (2013.01); *B01D 17/0214* (2013.01); *B01D 19/0042* (2013.01); *B01D 21/245* (2013.01); *E21B 43/34* (2013.01); *B01D 21/2483* (2013.01)

(58) Field of Classification Search
CPC .. B01D 21/245; B01D 21/2483; B01D 19/00; B01D 19/0042; B01D 17/0211; B01D 17/0214; E21B 43/34
USPC .......................................................... 96/183
See application file for complete search history.

(56) References Cited

U.S. PATENT DOCUMENTS 5,073,266 A * 12/1991 Ball, IV ................. B01D 17/00
                                                                    210/519

* cited by examiner

*Primary Examiner* — T. Bennett McKenzie
(74) *Attorney, Agent, or Firm* — Leydig, Voit & Mayer, Ltd.

(57) ABSTRACT

An improved water-oil separation apparatus with a separation vessel and associated water leg having internal inlet piping that feeds fluids to an engineered degassing boot, having an engineered degassing boot that is more effective in removing entrained gases from the incoming fluid stream, having an umbrella shaped upper baffle instead of an inverted umbrella shaped upper baffle, having an improved oil collection bucket or weir, having a much improved inlet water spiral distribution apparatus, having an improved water leg design, and having a water leg with a functional height that is externally adjustable to make it easier to regulate the oil-water interface level within the separation vessel.

17 Claims, 3 Drawing Sheets

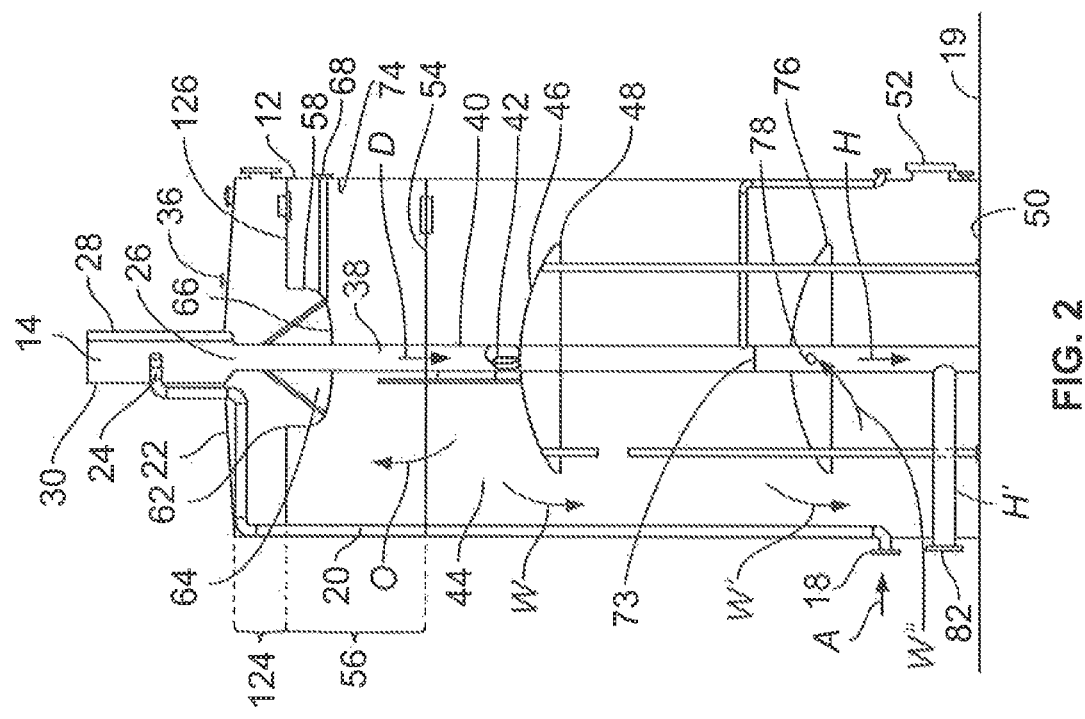
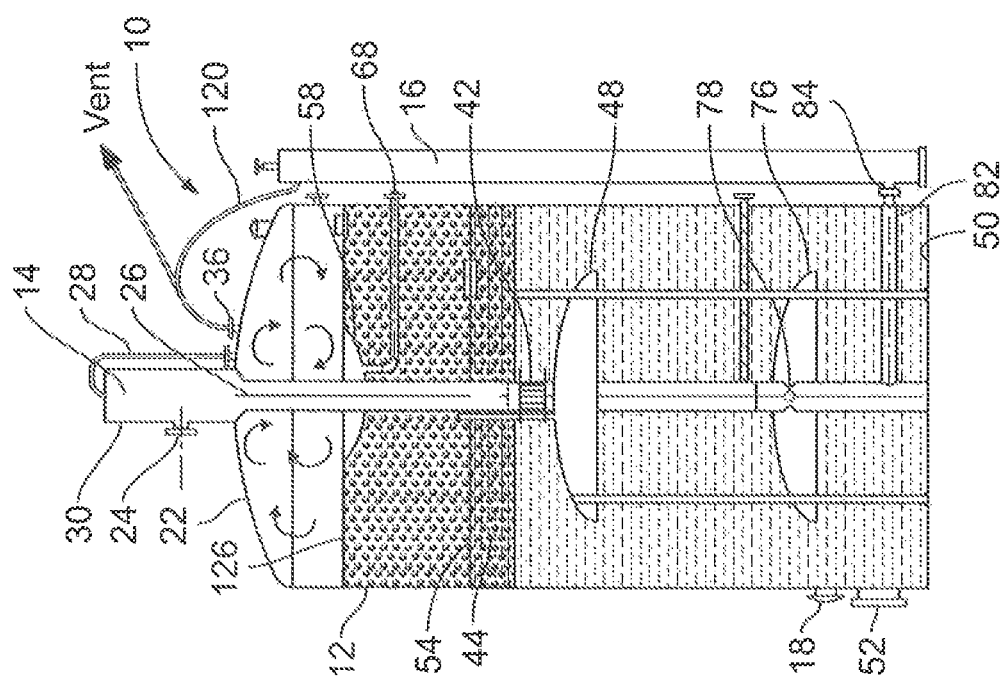
FIG. 1
FIG. 2

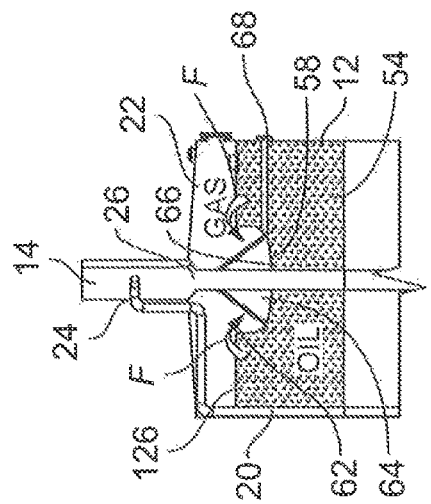
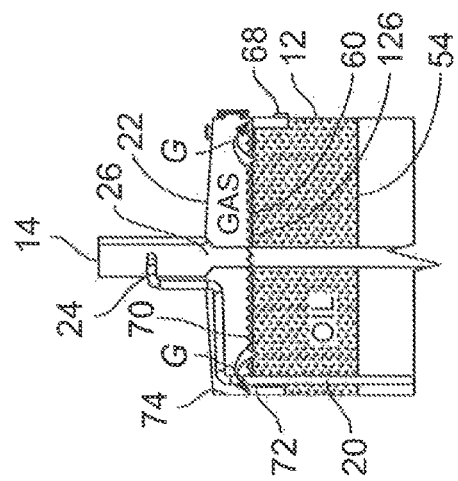
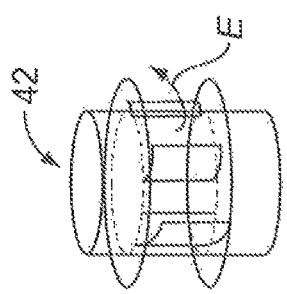
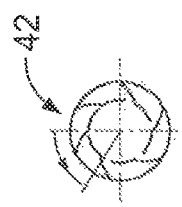
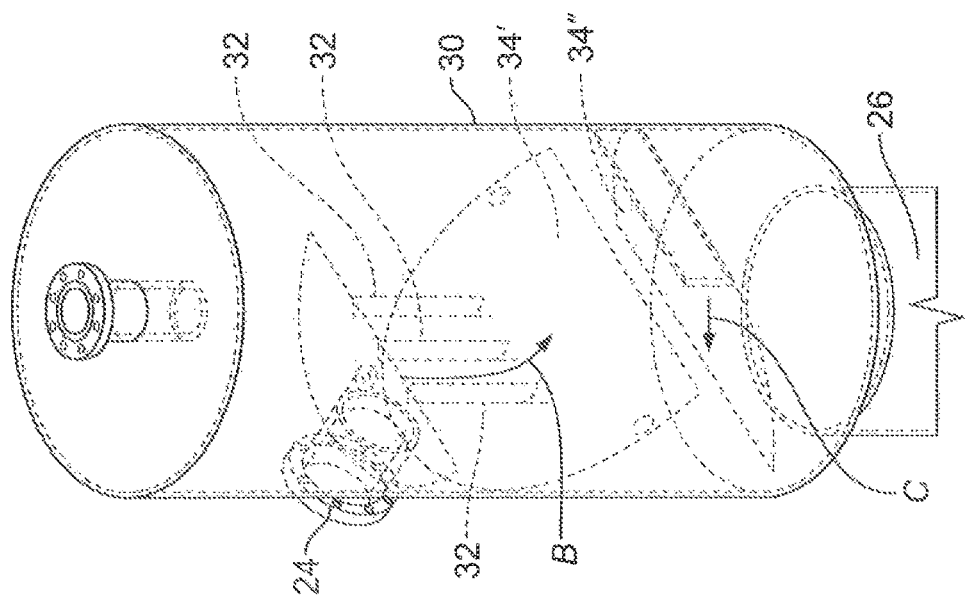

HYDRODYNAMIC WATER-OIL SEPARATION BREAKTHROUGH

CROSS-REFERENCE TO RELATED APPLICATIONS

This application is a continuation of U.S. patent application Ser. No. 15/652,998, filed Jul. 18, 2017, which is a continuation of U.S. patent application Ser. No. 14/337,900, which was filed on Jul. 22, 2014, now issued as U.S. Pat. No. 9,744,478 on Aug. 29, 2017.

BACKGROUND OF THE INVENTION

The present invention relates to a separation apparatus having a water-oil separator and associated water leg for separating gas, water and oil mixtures where the mixture contains a significant amount of water and a small amount of oil to be separated and recovered from the water. This invention is generally intended for use in treating fluid streams relating to petroleum oil and gas production.

The present invention improves over the separation apparatus taught in Applicant's U.S. Pat. No. 5,073,266. The teaching of that patent is hereby included by reference.

Specifically, the present invention includes improvements in having internal inlet piping that feeds fluids to an engineered degassing boot, in having an engineered degassing booth that is more effective in removing entrained gases from the incoming fluid stream, in having an umbrella shaped upper baffle instead of an inverted umbrella shaped upper baffle, in having an improved oil collection bucket or weir, in having an improved water leg design, and in having a water leg with a functional height that is externally adjustable to make it easier to regulate the level of the oil-water interface within the separation vessel.

It should be understood that the oil-water interface may not be a clearly defined line due to the fact that the separation zone contains a mixture of oil and water.

In applications where inlet fluids include significant quantities of gas, it is necessary to install a system designed to separate the gas from the liquids in order to prevent gas evolution related mixing in the liquids separation section downstream. The generic system is identified as a "degassing boot"; however these have always been and still are just empty vertical pipe liquids-gas "separators" where no engineering expertise was ever applied. Offsetting this, the present invention utilizes a similar vertical vessel with engineered internals. These internals absorb the momentum of the inlet fluids, redirecting their flow into a progressively thinner layer of liquids so the entrained gas can more readily escape.

Vertical flow diverters provided within the de-gassing boot in association with the fluid inlet spread the liquids out inside the de-gassing boot. The liquids then gravity flow down an inclined baffle provided within the de-gassing boot and at the end of the inclined baffle the liquids cascade onto an opposing inclined plate provided within the de-gassing boot which serves to further thin the stream for even more efficient gas-liquids separation.

Also, the present vessel is unique to the de-gassing boots on most previous vessels including the vessel taught in the '266 patent in that the total fluids inlet and the gas outlet are designed to be installed internal to the structure to avoid the safety hazards of having to install these piping assemblies in the field at dangerous elevations above OSHA minimums. Installing this piping in the factory during fabrication simplifies field installation and eliminates concerns for the installation of field piping at heights. This also eliminates the need for external insulation, as the inside piping prevents winter time freeze ups.

The invention of the '266 patent mechanically failed within two years of being placed in operation because the upper baffle, which was shaped like an upside-down umbrella, filled with heavy sand and solids which caused it to collapse within the vessel. The present invention has modified this design by inverting the upper baffle so that it does not fill with sand and solids.

While the vessel of the '266 patent was originally conceived as a skim tank dedicated to the skimming of small amounts of oil from large quantities of produced oilfield water, many users have recently requested that it be redesigned to provide a more significant oil layer to aid in the separation of water from the stored (skimmed) oil while still incorporating the skim tank design and oil-from-water separation efficiencies.

In order to do this the vessel had to be altered by either increasing the height of the vessel to provide additional oil storage space and maintain the skimming abilities designed into the original '266 vessel or an oil collection system had to be designed into the original '266 vessel which used only a simple side-mounted nozzle on the vessel to overflow oil.

The side mounted connection provided no measure of uniform oil collection necessary for the desired oil dehydration function.

The original '266 vessel was conceived as a 20' high vessel. In order to accommodate crude oil dehydration, that height had to be increased 4-10 feet, depending on the ease of dehydration according to Stokes' Law.

In order to accomplish the dehydration process, the crude oil layer must be 1) uniformly distributed, 2) quiescent, and 3) remain in the vessel for the maximum period of time. All of these factors are dependent on distribution of the incoming crude oil throughout the cross section of the vessel via a newly re-designed high efficiency inlet distributor, and the newly designed oil collection system(s).

When crude oil is light and water-from-oil separation is comparatively easy, the first of two different oil collection systems is used. It is a large diameter spillover bucket type collector concentrically located in the center of the vessel 1-2' from the top. The diameter is fixed at 5' which produces a 15.7' spillover weir. With only 2" of crest height (oil level above the weir edge) this engineered oil collector accommodates instantaneous flows of up to 51,360 barrels per day. With a 4" crest height, the flow can reach 145,440 barrels per day on an instantaneous or sustained basis into the vessel which means it is virtually impossible to flood the vessel and equally impossible to overflow crude oil out of the vessel and into the environment. The result is that less oil is wasted and more stock tank oil is sent to the refinery.

When crude oil is heavier, more care must be taken to assure its retention time in order to produce the desired dehydration results. In this case the vessel's oil collector described above is replaced with a circumferential ring trough. Adding this same feature to the vessel provides the desired results, completely dehydrating the inlet crude, making it ready for sale.

The '266 patent touted the use a water leg wherein the water flowed into and up the inside of two concentric pipes. Later hydraulic engineering studies proved the fallacy of this approach as the emphasis on maintaining a more and more constant contact elevation grew. It finally became clear that the original design needed to be reversed to minimize the effect varying flow rates have on the pressure drop through the water outlet piping and water leg.

The reason is not obvious, so it is worth an explanation. Remembering that this vessel is designed to remove small quantities of crude oil from large quantities of produced oilfield waters, it is important to understand the condition this oil is likely to be in. This oil remains in the water reaching this vessel because the oil droplets are exceedingly small. According to Stokes' Law of separation, smaller droplets separate at the square root of the separation rate of droplets twice their size. These small droplets have such a slow separation velocity that until they find an area of almost no movement, they stay entrained and dispersed in the water. The present vessel design gives these droplets that area, so the smallest of those oil droplets can accumulate. However, any movement of this area results in a high degree of re-entrainment of these small and fragile oil droplets.

Since the water outlet piping and the external water leg determine the variation in the level where these most fragile oil droplets are known to accumulate, this designer began to focus on minimizing any and all elevation or level changes in this layer. To do so the piping had to be enlarged and the water leg itself had to be both enlarged and re-designed.

The alteration moves the water out of the vessel through a much larger pipe, since fluids dynamics studies showed this outlet pipe to be a serious bottleneck restricting flow. By enlarging the outlet pipe the pressure drop is dramatically diminished, thus having the least possible influence on the oil-water contact elevation.

Then, the flow in the water leg was reversed so the water leaving the vessel flows into and up the annulus between two pipes where the friction loss is least, and therefore the pressure drop is minimized. The smaller the overall pressure drop through the water outlet piping and water leg, the less the movement at the oil-water interface. The result is far less re-entrainment of separated oils into the effluent water.

The '266 patent touted the use a water leg (e.g. a process monometer to control the oil-water contact elevation in a tank or vessel) which employed an internally removable internal part so it could be lengthened or shortened as needed to raise or lower the oil-water interface inside the body of the vessel. The removable part was a friction fit spigot shaped pipe pushed into an opposing angular bell ended pipe. Joining the spigot and the bell made for a junction which was sealed using waterproof grease. The bell and spigot connection and the grease allowed the removable part to be removed. To remove it an operator had to remove a very large and heavy flange to gain access to the insides of the water leg so the upper bell-portion could be removed. Once removed it could be shortened, or a new longer one could be made, thus shortening or raising the spillover height of the water leg itself, and correspondingly, raising or lowering the oil-water interface inside the vessel as was generically known to be necessary to optimize oil recovery and water quality improvements.

Over time it became apparent that working on the bell and spigot fittings was so arduous most operators did not bother. This meant fewer barrels of oil entered the economic stream, defeating the entire purpose for the vessel in the first place. The present invention replaces the bell and spigot fittings and all that was associated with them with an externally adjustable adjustment assembly.

The function of the external adjustment assembly is to provide a simple mechanism which allows the operator to make adjustments "on the fly" without interrupting his operation. Adjustments to the water leg are necessary to optimize oil recovery, and may be made on a day-to-day basis where an external adjuster is available.

The external adjuster is a comprised of an internal slip-sleeve which rides up and down on a smooth pipe section. The sip sleeve is O-ring sealed onto the smooth pipe section to avoid leakage which could/would defeat its function. The slip sleeve is connected to an external jack screw assembly to which a worm gear mechanism is connected. A hand wheel is mated to the worm gear so that turning the hand wheel clockwise raises the slip sleeve while turning the hand wheel counterclockwise lowers the slip sleeve. The worm gear is connected to the slip sleeve by a hollow light-weight rod which is lubricated through a packing gland to completely seal the water leg so no contaminants (water, oil or gas) escape into the atmosphere.

The water inside the water leg rises between two concentric pipes, and spills over into the inner pipe at the elevation set by the adjuster. A one inch change in the adjuster elevation translates to a four inch change in the water-oil contact point (elevation) inside the vessel.

The real benefit of this adjuster is that it provides a simple way for the operator to adjust the critical level in the vessel. By raising the level the operator send more separated oil to the sales oil tank, improving the cash flow of his company. These fine adjustments also improve the separation of oil from water, maximizing the efficiency of the vessel and minimizing the quantity of otherwise wasted crude oil. Crude oil not separated in the vessel often is disposed of with the waste water into deep disposal wells, where the oil is a plugging agent that tends to plug the well and prevents disposal over the long term. This can cost oil operators millions of dollars in re-drill expenses when a disposal well must be replaced.

BRIEF SUMMARY OF THE INVENTION

The present invention improves over the separation apparatus taught in Applicant's U.S. Pat. No. 5,073,266 by including improvements in having internal inlet piping leading to an engineered degassing boot, in having an umbrella shaped upper baffle instead of an inverted umbrella shaped upper baffle, in having improved oil collection buckets or weirs, in having improved water leg design, and in having an externally adjustable height water leg for regulating the levels within the separation vessel.

BRIEF DESCRIPTION OF THE SEVERAL VIEWS OF THE DRAWING(S)

FIG. 1 is a side view of a hydrodynamic water-oil separation breakthrough system that is constructed in accordance with a preferred embodiment of the present invention and includes a separation vessel and an associated water leg.

FIG. 2 is the separation vessel of FIG. 1 drawn to shown the internal inlet piping that feeds incoming fluid to the de-gassing boot.

FIG. 3 is an enlarged perspective view of the de-gassing boot of FIGS. 1 and 2 with structures located within the de-gassing boot shown in outline.

FIG. 4 is a perspective view of the spiral inlet diffuser from the separation vessel of FIGS. 1 and 2.

FIG. 5 is a top plan view of the spiral inlet diffuser of FIG. 4.

FIG. 6 is the separation vessel of FIG. 2 shown with a bucket type oil collector.

FIG. 7 is the separation vessel of FIG. 6 shown with an alternate serrated top weir type oil collector instead of a bucket type oil collector.

DETAILED DESCRIPTION OF THE INVENTION

Figures 8, 9, 10:
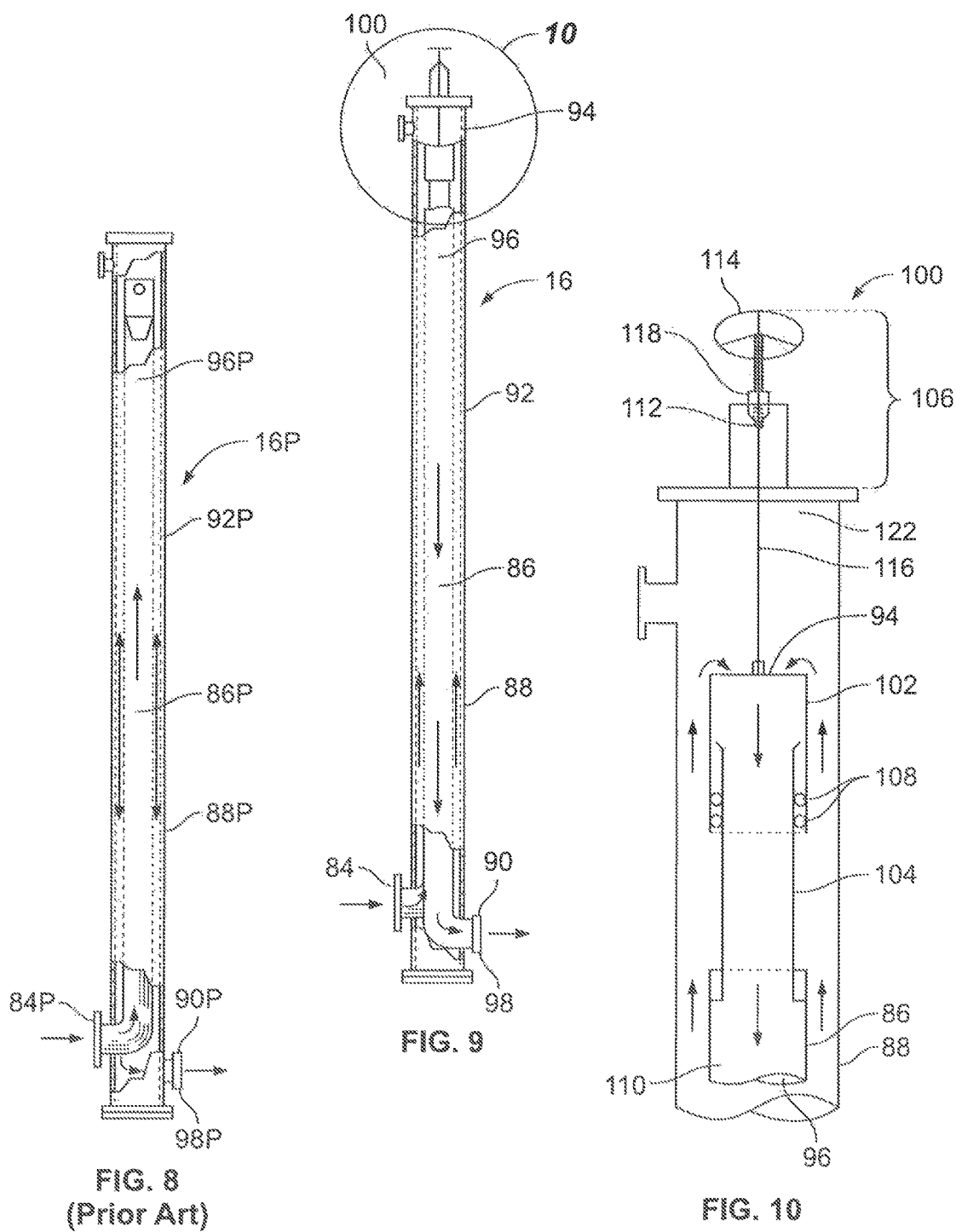
FIG. 8 is a front view of a prior art water leg.
FIG. 9 is a front view of the water leg of FIG. 1.
FIG. 10 is an enlarged view of the upper end of the water leg shown within circle 10 of FIG. 9 and showing the external means for adjusting the height of the internal slip sleeve provided within the water leg.

Referring now to the drawings and initially to FIG. 1, there is illustrated a hydrodynamic water-oil separation breakthrough system or separation apparatus 10 that is constructed in accordance with a preferred embodiment of the present invention. The system 10 includes a vertical separation vessel 12 equipped with an engineered degassing boot 14 and an attached water leg 16.

As shown in FIG. 2 by arrow A, a fluid mixture of gas, oil, water and entrained solids enters the vessel 12 at a fluid mixture inlet 18. The fluid mixture inlet 18 is near ground level 19. The fluid mixture then flows through internal inlet piping 20 within the vessel 12 to a top 22 of the vessel 12 where the internal inlet piping 20 attaches to a fluid inlet 24 of the engineered degassing boot 14. The engineered degassing boot 14 is designed to separate gas from the remaining mixture of liquids and solids of the incoming fluid mixture.

The internal inlet piping 20 is designed to be preinstalled internally in the vessel 12, and the fluid inlet 24 to the degassing boot 14 and the degassing boot gas outlet 26 and degassing boot gas equalization line 28 connecting the degassing boot 14 and into the top 22 of the vessel 12 are designed to be connected prior to installation of the vessel 12 to avoid the safety hazards of having to install these piping assemblies 20 and 28 in the field at dangerous elevations above OSHA minimums. Installing these piping assemblies 20 and 28 in the factory during fabrication simplifies field installation and eliminates concerns for the installation of field piping at heights. The internal piping also has the advantage of preventing freeze-ups in the colder winter months.

Referring to FIG. 3, the flow path through the engineered degassing boot 14 is shown by Arrows B and C. The engineered degassing boot 14 utilizes a vertical degassing tank 30 with engineered internals that is attached at the top 22 of the separation vessel 12. These internals include vertical flow diverters 32 and inclined baffles 34 that absorb the momentum of the inlet fluids, redirecting their flow into a progressively thinner layer of liquids so the entrained gas can more readily escape.

The vertical flow diverters 32 provided within the de-gassing boot 14 in association with the fluid inlet 24 spread the liquids out inside the de-gassing boot 14. The liquids then gravity flow down a first inclined baffle or plate 34' provided within the de-gassing boot 14 and at the end of the first inclined baffle or plate 34', the liquids cascade onto an opposing second inclined baffle or plate 34" provided within the de-gassing boot 14 which serves to further thin the stream for even more efficient gas-liquids separation. The degassing boot gas equalizer line 28 connects the degassing boot 14 and the top 22 of the vessel 12, and excess gas accumulating in the top 22 of the vessel 12 and in the degassing boot 14 is removed from the system 10 via a gas vent 36 provided in the top 22 of the vessel 12.

The degassed liquids then flow under the influence of gravity downward within an upper portion 38 of a central tube 40 provided in the vessel 12, as shown by Arrow D, and exit the central tube 40 at a spiral inlet diffuser 42, shown in detail in FIGS. 4 and 5.

The degassed liquids flow through the spiral inlet diffuser 42 which imparts an ever increasing spiral flow path to the liquids as they enter a separation zone 44 of the vessel 12, as shown by Arrow E. This spiral flow path does two things.

First, the spiral flow path slows the flow so that solids contained within the degassed liquids tend to fall out onto a convex top 46 of an umbrella shaped upper baffle 48 that is located just below the spiral inlet diffuser 42. Because the top 46 of the upper baffle 48 is convex, sand and other solids that fall on it do not accumulate to any great extent on the top 46 of the upper baffle 48, but instead tend to roll off of the upper baffle 48 and fall to a bottom 50 of the vessel 12 where they can be periodically removed via a manhole 52 provided in the vessel 12.

Second, the spiral flow path provides sufficient retention time and quiescence to allow oil droplets to disengage from the water within the liquid stream and to migrate upward to an oil-water interface 54, as indicated in FIG. 2 by Arrow O where the oil eventually migrates into an oil layer 56 located above the oil-water interface 54 due to the difference in density.

Excess oil is removed from the oil layer 56 and from the vessel 12 by one of two alternate structures: a bucket type oil collector 58, as shown in FIG. 6, or alternately, a serrated top weir type oil collector 60, as shown in FIG. 7.

As shown in FIG. 6 by Arrows F, oil flows from around the outside of the bucket type oil collector 58 and flows over the top 62 of the bucket type collector 58 at a gas-oil interface 126 located within the vessel 12 to enter the inside 64 of the bucket type collector 58 and out the bottom 66 of the bucket type collector 58 and out of the vessel 12 via an oil outlet 68.

Alternately, as shown in FIG. 7 by Arrows G, oil within the oil layer 56 flows upward through the open central area of a serrated top weir type oil collector 60 and flows over the serrated top edge 70 of the serrated top weir type oil collector 60 to enter a circumferential oil trough 72 formed between the serrated top weir type oil collector 60 and an interior wall 74 of the vessel 12 and then out of the vessel 12 via the oil outlet 68 that communicates with the oil trough 72.

After exiting the spiral inlet diffuser 42, as oil is separating and moving upward within the vessel 12, water separates flows downward around the upper baffle 48, as shown in FIG. 2 by Arrow W, and also around an umbrella shaped lower baffle 76, as shown by Arrow W', before entering water outlet openings 78 provided just below the lower baffle 72 in a lower portion 80 of the central tube 40, as shown by Arrow W".

The lower portion 76 of the central tube 40 is isolated via a separating plate 73 from the upper portion 38 of the central tube 40 through which the incoming flow from the degassing boot 14 enters the vessel 12. Water entering the water outlet openings 78 flows downward through the lower portion 76 of the central tube 40 and out of the vessel 12 at a water outlet 82 provided in the vessel 12, as shown by Arrows H and H'. As shown in FIG. 1, the water outlet 82 is connected to a water leg inlet 84 of the water leg 16.

FIG. 8 shows via arrows the flow path of water entering a prior art water leg 16P wherein the water flows into the interior 96P of an innermost pipe 86P of two concentric pipes 86P and 88P provided in the prior art water leg 16P. The water then flows up within the innermost pipe 86P and flows over the top of the innermost pipe 86P. The water then enters an annulus 92P located between the two concentric pipes 86P and 88P before flowing downward within the annulus 92P to a water leg water outlet 98P. The water leg water outlet 98P of the prior art water leg 16P is in fluid communication with the annulus 92P and serves to remove water from the prior art water leg 16P.

In prior art water legs 16P, the water leg inlet 84P to the water leg 16P was a bottleneck that restricted flow and caused undesirable pressure drop through water outlet piping 90P and the water leg 16P due to the restricting flow area within the innermost pipe 86P.

FIG. 9 shows the water leg 16 employed in the present invention. In the present water leg 16, the water outlet 82 from the vessel 12 is connected to the water leg inlet 84 of the water leg 16, and the water leg inlet 84 of the water leg 16 communicates with an annulus 92 between the two concentric pipes 86 and 88 provided in the present water leg 16. Thus, upon entering the present water leg 16, the water flows upward within the annulus 92 between the pipes 86 and 88 until it reaches the top 94 of the innermost pipe 86 which serves as a weir for the water to flow over and into the interior 96 of the innermost pipe 86 from which it falls downward within the interior 96 of innermost pipe and then exits the present water leg 16 at the water leg water outlet 98 that is in communication with the interior 96 of the innermost pipe 86.

Referring to FIG. 10, to increase or decrease the functional height of the innermost pipe 86, the present water leg 16 is provided with an external adjuster 100. The external adjuster 100 is comprised of an internal slip-sleeve 102 which rides up and down on an internal smooth pipe section 104 and external means for raising and lowering the slip-sleeve 106. The slip sleeve 102 is sealed with O-rings 108 onto the smooth pipe section 104 to avoid leakage which would defeat its function. The slip sleeve 102 is connected via a vertical pipe extension 116 to an external jack screw assembly 106 as a means for raising and lowering the slip-sleeve 106 relative to the lower portion of the innermost pipe 86. The external jack screw assembly 106 is provided with a worm gear mechanism 112 that is mated to a hand wheel 114 so that turning the hand wheel 114 clockwise raises the slip sleeve 102, while turning the hand wheel 114 counterclockwise lowers the slip sleeve 102. The worm gear mechanism 112 connects to the slip sleeve 106 via the vertical pipe extension 116 which is preferably a hollow, light-weight rod which is lubricated through a packing gland 118 to completely seal the water leg 16 so no contaminants including, but not limited to water, oil or gas, escape into the atmosphere.

As shown in FIG. 9, the water inside the water leg 16 rises between the two concentric pipes 86 and 88, and spills over into the inner pipe 86 at the elevation set by the adjuster 100. A water leg gas equalizer line 120 connects the top 122 of the water leg 16 with a gas layer 124 located above a gas-oil interface 126 within the top 22 of the vessel 12 to equalize pressure between the two structures 12 and 16.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A separation apparatus comprising:
a separation vessel;
a tube provided in the separation vessel;
inlet piping attached to an inlet disposed along an upper portion of the tube, the inlet piping adapted to introduce a fluid mixture into a separation portion of the vessel where the fluid mixture separates into a gas, which gas collects in a gas layer at a top portion of the separation vessel, and into an oil layer and a water layer, which oil and water layers collect within the separation vessel below the gas layer;
an outlet for the water layer provided within the water layer in the separation vessel;
a water leg operably associated with the separation vessel;
wherein the outlet for the water layer communicates with an inlet of the water leg that regulates a level of interface between the oil layer and water layer within the vessel, and an outlet provided on the water leg for discharging water out of the water leg,
wherein the water leg is provided with an inner tube concentrically located within an outer tube and an adjustable height upper end of the inner tribe serving as a flow over weir allowing water entering the water leg from the separation vessel to travel upward within the water leg and crest over the flow over weir to flow downward within the water leg to the outlet provided on the water leg,
wherein the water leg includes an internal slip-sleeve that is configured to raise and lower relative to the inner tube, and
wherein the water leg includes an internal pipe section attached to the inner tube and the internal slip-sleeve is disposed to raise and lower on the internal pipe section.

2. The separation apparatus of claim 1, further comprising an upper baffle provided within the vessel below the inlet.

3. The separation apparatus of claim 2, further comprising a lower baffle located below the upper baffle within the vessel.

4. The separation apparatus of claim 1, further comprising means for skimming oil off the oil layer provided within the vessel, wherein the means for skimming oil fluidly communicates with an oil outlet for removing the skimmed oil from the vessel.

5. The separation apparatus of claim 1, wherein the adjustable height upper end of the water leg is adjusted in height external to the inner tube and the outer tube of the water leg.

6. The separation apparatus of claim 1, wherein the water leg is external to the vessel.

7. The separation apparatus of claim 5, wherein the water leg includes an external adjuster comprising an external jack screw assembly.

8. The separation apparatus of claim 7, wherein the slip-sleeve is responsive to the operation of the external jack screw assembly.

9. The separation apparatus of claim 7, wherein the external jack screw assembly includes a worm gear mechanism.

10. The separation apparatus of claim 9, wherein the external jack screw includes a hand wheel that is configured to turn the worm gear mechanism.

11. The separation apparatus of claim 10, wherein the worm gear mechanism is attached to the internal slip-sleeve to raise and lower the internal slip-sleeve.

12. The separation apparatus of claim 11, wherein a rod attaches the worm gear mechanism to the internal slip-sleeve.

13. The separation apparatus of claim 12, further comprising a packing gland through which the rod passes, the packing gland sealing the water leg and providing lubrication to the rod.

14. The separation apparatus of claim 1, wherein the internal pipe section is smooth.

15. The separation apparatus of claim 1, wherein the internal slip-sleeve is sealingly disposed on the internal pipe section.

16. The separation apparatus of claim 1, wherein the internal slip-sleeve forms the weir.

17. The separation apparatus of claim 1, further comprising a gas equalization passage that fluidly interconnects a top of the water leg with a top portion of the separation vessel.

* * * * *